Inventors
Carlton M. Gerhart, Jr.
Thomas C. Jednacz

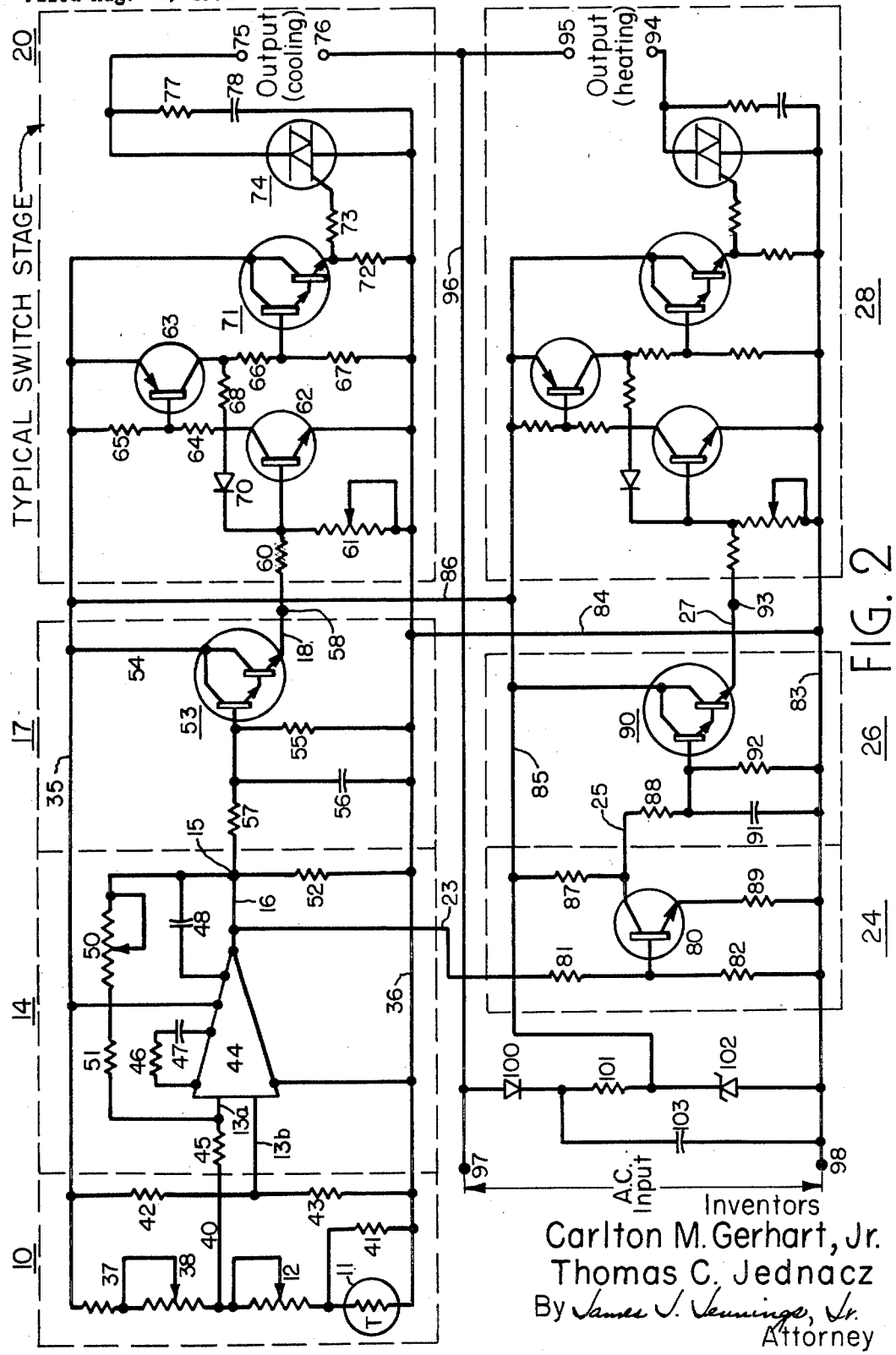

United States Patent Office 3,500,898
Patented Mar. 17, 1970

3,500,898
CONTROL SYSTEM FOR MULTI-STAGE HEATING AND COOLING SYSTEM
Carlton M. Gerhart, Jr., Dover, and Thomas C. Jednacz, York, Pa., assignors to Borg-Warner Corporation, Chicago, Ill., a corporation of Delaware
Filed Aug. 26, 1968, Ser. No. 755,280
Int. Cl. F25b 29/00; G05d 15/00
U.S. Cl. 165—26                                              7 Claims

ABSTRACT OF THE DISCLOSURE

An input circuit provides a control signal related both to ambient temperature and a pre-set control point. The control signal is amplified and passed to a first delay stage and to a logic inverter. This first delay stage provides a trigger signal delayed in time relative to the control signal, and this trigger signal is applied to all of the cooling switches to bring on the various stages at different levels determined by settings in the respective cooling switches. The logic inverter passes the inverted control signal to a second delay stage, which similarly provides a second trigger signal delayed in time with respect to the inverted control signal. One or more heating switches are coupled to the second delay stage for selective actuation to bring on the different stages of heating in accordance with the settings in the input portion of each heating switch.

BACKGROUND OF THE INVENTION

Figure 1:
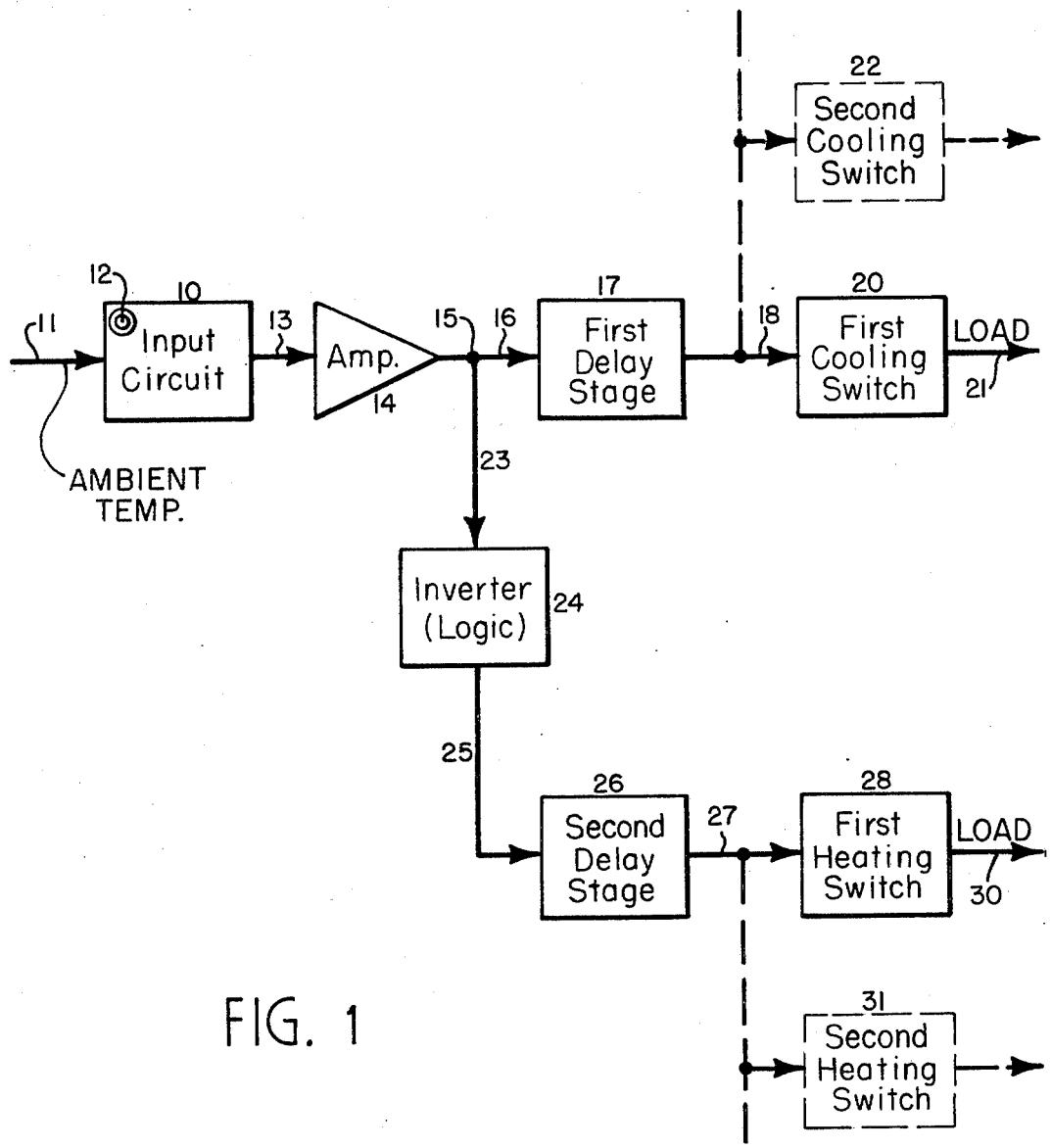

Various stringent requirements are imposed on temperature control systems to regulate the environment of human beings by reason of the physiological response of the individuals, and further by regulations promulgated by utility companies. The human mechanism is sufficiently sensitive to detect cycling of the system in present arrangements using mercury bulb thermostats and bi-metal strips. With a system including four stages, where each "stage" represents the energization of a heating or cooling unit, about the best performance presently achieved is an eight degree temperature span. With this wide temperature swing the person or persons in such environment notice a perceptible physical difference as the temperature is shifted through this range. It is therefore a primary consideration of the present invention to minimize this wide temperature swing previously encountered with such systems.

The utility companies strongly suggest that temperature control systems make certain provisions for bringing the load back on the line gradually after a power outage, to avoid throwing all the load directly back on the line as the generating station or transmission link attempts to restore power. It is therefore also an important consideration to provide such a control system for a multi-stage system which delays energy transfer to all the stages for a minimum time period after energy is restored to the system, and thereafter brings the several stages smoothly and successively on the line until the entire heating or cooling load is again being handled. It is a corollary consideration to achieve this smooth, successive restoration of operation whether the system was in the heating or cooling condition at the time of the power outage.

SUMMARY OF THE INVENTION

The control system of the present invention is useful in regulating energy transfer to a cooling load and to a heating load as a function of the temperature measured by a temperature-sensitive component, such as a Thermistor. The combination of the invention includes an input circuit, comprising the temperature-sensitive component and an adjustable component, such as a potentiometer, to provide a control signal related both to the temperature sensed by the Thermistor and the setting of the potentiometer. A preferred embodiment includes an operational amplifier for passing the control signal to a first delay stage and to an inverter stage, but the operational amplifier is not requisite to the basic combination. The first delay stage provides a trigger signal delayed in time relative to the control signal for actuating a first switch which is coupled between the first delay stage and the cooling load. When actuated by the trigger signal this first switch effects energy transfer to the cooling load. If additional stages of cooling are utilized, additional switches identical to the first switch are coupled to the respective additional cooling stages, and the input circuit of each of these switches is coupled to a common point at the output side for the first delay stage. Each such switch may include a feedback pair of transistors connected for rapid switching action when the appropriate level of trigger signal is applied, and in a preferred embodiment a Darlington pair of transistors is provided to isolate the feedback pair from a Triac or other power switch which transfers energy to the load.

A second delay stage is coupled to the inverter stage to provide a second trigger signal delayed in time with respect to the inverted control signal provided by the inverter stage. A second switch is coupled between this second delay stage and the heating load for passing energy to the heating load in accordance with the trigger signal received from the second delay stage. If additional heating stages are provided corresponding additional second switches are provided and respectively coupled to the additional heating stages, and the input portions of all the switches are coupled in common to the output side of the second delay stage. Means, such as electrical conductors, is also provided for passing energy into the control system to effect the desired energization of the heating and cooling loads.

DRAWINGS

In both figures of the drawings like reference numerals identify like elements, and in the drawings:

FIGURE 1 is a block diagram of a control system constructed in accordance with the inventive teaching; and FIGURE 2 is a schematic diagram depicting details of the circuits shown more generally in FIGURE 1.

GENERAL SYSTEM ARRANGEMENT

In FIGURE 1 input circuit 10 receives a first signal, related to the ambient temperature, over line 11. An adjustable component, shown as a knob 12, provides means for setting the desired control point of this circuit. The control signal provided by input circuit 10 is thus a function of the ambient temperautre and of the setting of knob 12. This control signal is passed over line 13 to an amplifier 14, which amplifies the control signal and apples it to a junction 15. The amplified control signal is passed from junction 15 over line 16 to a first delay stage 17, which produces a trigger signal delayed in time relative to the control signal. This delayed trigger signal is passed over output line 18 to a first cooling switch 20. When energized by an appropriate trigger signal the first cooling switch operates to pass energy over output line 21 to the first cooling stage (not shown). The provision of a second cooling switch 22 is indicated in broken lines to show the interconnection of such switch if an additional cooling stage is provided, and additional cooling switches and stages can be coupled in the system in an obvious manner.

The amplified control signal at junction 15 is also passed over line 23 to an inverter 24, connected to invert the sense of the amplified control signal and pass this inverted control signal over line 25 to a second delay stage 26. The second relay stage in its turn provides a second trigger signal, delayed in time relative to the inverted control signal, which is passed over line 27 to the first heating stage 28. When actuated by a suitable trigger signal received over line 27, heating switch 28 operates to transfer energy over line 30 to the first heating stage (not shown). If an additional heating stage is provided, a second heating switch 31 is provided as indicated by the broken lines, and still more heating switches and stages can be coupled to the output side of second delay stage 26 to effect the energization of the several heating stages.

DETAILED DESCRIPTION OF THE INVENTION

As shown in the upper left-hand portion of FIGURE 2, input circuit 10 includes a D-C bridge circuit. A pair of conductors 35, 36 transfer D-C energy to the input terminals of the bridge circuit. One leg of the bridge includes a resistor 37 coupled in series with a potentiometer 38, which is adjustable to compensate the bridge arrangement for variations in the thermistor manufacturing tolerances. A first output conductor 40 is coupled between the described first leg of the bridge circuit and the second leg. The second leg, coupled between conductors 40 and 36, includes a series circuit comprised of the temperature level (or control point) setting potentiometer 12 and the thermistor 11, with a compensating resistor 41 coupled in parallel with the thermistor. The third and fourth legs of the bridge are provided by resistors 42 and 43, shown coupled between conductors 35 and 36. The second output connection of the bridge, at the common electrical connection of resistors 42 and 43, is coupled over conductor 13b to the lower input terminal of an operational amplifier 44 in the amplifier circuit 14. The upper input terminal of this amplifier 44 receives the signal over conductor 40, resistor 45 and conductor 13a.

Operational amplifier 44 has one terminal on its underside coupled directly to conductor 36. Along the upper portion of this amplifier a series circuit including a resistor 46 and a capacitor 47 is coupled between the first two upper terminals. The third upper terminal is coupled directly to conductor 35. The fourth terminal is coupled through a capacitor 48 to the common output junction 15 of this amplifier, which junction is also coupled back through a potentiometer 50 and resistor 51 to the upper input conductor 13a of this stage. The output junction 15 is also coupled through another resistor 52 to conductor 36.

First time delay stage 17 comprises an assembly 53, which designates a Darlington-connected pair of transistors. The collector connection of this unit 53, the common connection of this stage, is coupled over conductor 54 to conductor 35. The base or input connection of the Darlington pair is coupled through a first resistor 55 to conductor 36, and capacitor 56 is coupled in parallel with resistor 55. Input resistor 57 is coupled between conductor 16 and the input connection of the Darlington pair. Those skilled in the art will appreciate that the components 55–57 cooperate with the Darlington-connected pair of transistors to provide a trigger signal on output conductor 18 delayed in time with respect to the amplified control signal provided on conductor 16. This trigger signal is applied to a common cooling junction 58, and all the cooling switch stages connected in the system have their respective input circuits coupled to this common connection 58.

First cooling switch 20 includes an input voltage divider comprised of a resistor 60 coupled in series with a potentiometer 61 between terminal 58 and conductor 36. Thus the setting of potentiometer 61 determines the level of the signal voltage required to be received from junction 58 to switch stage 20. An NPN type transistor 62 is coupled with an PNP type transistor 63 in a feedback pair. That is, the base of transistor 62 is coupled to the common connection between resistor 60 and potentiometer 61, and the emitter of this transistor is connected directly to conductor 36. Its collector is coupled through a series circuit including resistors 64 and 65 to conductor 35. The emitter of transistor 63 is coupled directly to conductor 35, and its base is coupled to the common connection between resistors 64 and 65. The collector of transistor 63 is coupled through a series circuit including resistors 66 and 67 to conductor 36, and the collector is also coupled over a feedback path including a resistor 68 and a diode 70 to effect positive latching of the feedback pair of transistors when transistor 63 is gated on. The effective resistance value of resistor 68 determines the switching differential for this particular switching stage 20.

Another Darlington-connected pair of transistors is referenced by numeral 71, with the base or input connection to this unit being coupled to the common connection between resistors 66 and 67. The collector or common connection of this unit 71 is coupled to conductor 35, and its emitter, which is its output connection, is coupled through a resistor 72 to conductor 36. The emitter is also coupled through another resistor 73 to the gate or input connection of a thyristor unit 74, which may be a triac. This thyristor is coupled between conductor 36 and an output connection 75, with the load of this first cooling state being connected between terminals 75 and 76. A series circuit comprising a resistor 77 and a capacitor 78 is coupled between terminal 75 and conductor 36.

The Darlington pair 71 is provided where indicated in the stage 20 to isolate the feedback pair 62, 63 from the triac 74, to prevent A-C in the gate circuit of thyristor 74 from disturbing the D-C levels established in the transistor circuit 62, 63 which might otherwise cause chattering of this solid state switch.

Inverter stage 24 includes an NPN type transistor 80 having its base coupled to the common connection between a pair of voltage divider resistors 81, 82. The other side of resistor 81 is coupled over conductor 23 to the output junction 15 of operational amplifier 44, and the other side of resistor 82 is coupled to a conductor 83. It is noted that conductor 83 is coupled over conductor 84 to conductor 36, and energizing conductor 85 is coupled over conductor 86 to conductor 35.

The collector of transistor 80 is coupled over a resistor 87 to conductor 85, and the collector is also coupled over conductor 25 and a resistor 88 in the second delay stage 26 to the base or input connection of the Darlington pair 90. A capacitor 91 and resistor 92 are coupled in parallel between the base connection of unit 90 and conductor 83. The common or collector connection of unit 90 is coupled directly to conductor 85, and the emitter or output connection of this unit is coupled over a common hot terminal connection 93 to the input circuit of first heating switch 28. The circuit of switching stage 28 is identical to that of stage 20, operating to pass current through a thyristor, output terminal 94, the first heating stage, and output terminal 95 to the common line 96 when an appropriate trigger signal appears at common connection 93.

A power supply shown in the lower left-hand portion of FIGURE 2 includes a pair of input terminals 97, 98 for receiving a low voltage A-C input. Terminal 97 is connected over conductor 96 to both of terminals 76 and 95. A series circuit comprising a diode 100, a resistor 101 and a Zener diode 102 is coupled between conductors 96 and 83. A capacitor 103 is coupled in parallel with resistor 101 and diode 102. Conductor 85 is coupled to the common connection between resistor 101 and diode 102, and conductor 85 is also coupled over conductor 86 to conductor 35.

Operation of the invention

The system is energized by applying an alternating voltage to the power supply input terminals 97, 98. In a preferred embodiment for which suitable circuit values will be given hereinafter the input energy was 24 volts A-C. Potentiometer 12 is adjusted to preset the desired temperature level at which the system is to be controlled. The first cooling stage is coupled between terminals 75 and 76, and input potentiometer 61 is adjusted to preset the signal level at which switch 20 will be actuated. If an additional stage of cooling is utilized, the additional cooling switch will similarly have a pair of output terminals for connection to the second cooling stage load. The second cooling switch will also have an input control connection for coupling to the common cold terminal 58, a pair of energizing connections for connection to the conductors 35, 36, and an input potentiometer to preset the switching point, in a manner apparent from the preceding description. Likewise the first heating stage is coupled between terminals 94, 95 and the input potentiometer of stage 28 is adjusted to determine the point at which the first heating stage is to be energized. If an additional heating stage is utilized the input potentiometer of each additional stage is similarly adjusted. Up to eight stages of heating and/or cooling can be supplied with the system of this invention, and the stages can be intermixed in various combinations. By way of example there may be four stages of heating and four stages of cooling, six stages of heating and two stages of cooling, three stages of cooling and two stages of heating, or another desired variation.

Assuming initially that the temperature in the space to be controlled rises, a negative-going signal is provided from the bridge circuit in the input circuit 10 and amplified in operational amplifier 44 to provide an increasingly positive D-C amplified signal between output terminal 15 and conductor 36. This signal is supplied to the first delay stage 17 which, after a short interval determined by the circuit constants in this stage, applies a trigger signal over common cold terminal 58 to the first cooling switch 20. This positive-going signal serves to forward bias the first transistor 62 in stage 20, which begins to conduct and provides a voltage drop across resistor 65 which also forward biases transistor 63, which also conducts. As transistor 63 conducts the positive-going voltage appearing at its collector is fed back through resistor 68 and diode 70 to additional bias transistor 62 towards saturation. Thus this feedback pair latches and provides a gating signal through the Darlington-connected pair 71 to gate on thyristor 74. As this thyristor or triac conducts, A-C energy is passed through the first cooling stage over a circuit which extends from terminal 97, over conductor 96, terminal 76, the impedance presented by the first cooling stage, terminal 75, thyristor 74, conductors 36, 84 and 83 back to terminal 98. Thus the first cooling stage will operate and begin to reduce the temperature in the controlled area.

Inverter stage 24 receives the positive-going D-C signal over conductor 23 and this logic stage produces a negative-going signal between the collector of transistor 80 and conductor 83 under the described conditions, with a temperature rise in the controlled space sensed by thermistor 11. Accordingly no gating signal is passed through delay stage 26 under these conditions. However with a negative-going signal at terminal 15, signifying a decrease in temperature in the controlled area, there is no trigger signal appearing at junction 58 and the output from inverter logic stage 24 is a positive-going signal which, after the delay provided by stage 26, provides a trigger signal at common hot junction 93 which serves to energize the first heating stage. The operation of first heating switch 28 is the same as that just described for the first cooling switch 20.

ADVANTAGES OF THE INVENTION

It is again emphasized that delay stages 17, 26 insure that upon restoration of power after an outage the heating or cooling stages will be brought on gradually and in sequence, with a time delay not only before the first stage is energized, as insured by stage 17 or 26, but an additional delay between each successive stage as determined by the setting of the input potentiometer (such as 61) in the input portion of each switching stage. This fail-safe operation occurs whether the system is calling for heating or cooling. The input potentiometer facilitates the settings of the temperature differential per stage and the temperature span between adjacent stages. There is always a time delay in the system between operation of stages when the system is cycling on and off.

True proportioning control is obtained by the inventive system within a very narrow proportioning band. High sensitivity is achieved without heat anticipation and with only negligible switching differentials per stage. The system is flexible in that any desired number of cooling or heating stages may be connected as described above. Different combinations of heating and cooling stages may be utilized with a suitable "dead band" between the heating and cooling points. The temperature sensor may be located at a point distant from the control system itself and, because D-C signals are utilized, shielding of the extended leads is not required. In addition the system facilitates remote and automatic reset of the control point by the addition of another sensor in the bridge circuit. With the use of solid state components the sensor is immune to damage and adverse effects from mechanical vibrations. Even if the set point dial which adjusts potentiometer 12 is rapidly manipulated, the delay stages obviate rapid cycling of the controlled equipment.

Low cost electronic components readily available from commercial sources were utilized throughout the system. Solely to enable those skilled in the art to practice the invention, and in no sense by way of limitation, a table of circuit components and identification or values is set out below. These components were utilized with an input alternating voltage of 24 volts applied to terminals 114, 115. Operational amplifier 44 was a G.E. PA238, with its 10 and 12 terminals connected as the upper and lower inputs. The four terminals shown from left to right along the top of unit 44 were the 1, 14, 3 and 5 terminals. The 8 terminal was connected to conductor 36, and the 7 was connected as the output terminal.

| Component: | Identification or value |
|---|---|
| 11 | G.E. 1D401. |
| 44 | G.E. PA238. |
| 53, 71, 90 | 2N5305. |
| 62, 80 | 2N3975. |
| 63 | G.E. D29A4. |
| 74 | RCA 40525, triac. |
| 70 | 1N34. |
| 100 | G.E. AF14, 1.5 a., 100 PIV. |
| 102 | G.E. Z4XL12B Zener, 12 v., 1 w. |
| 47 | 0.001 mfd. |
| 48 | 47 pfd. |
| 56, 91 | 100 mfd. 15 v. DC. |
| 78 | 0.1 mfd. |
| 103 | 250 mfd., 50 v. DC. |

| Component: | Resistance in ohms |
|---|---|
| 12 | 2,000 pot. |
| 37, 42, 43 | 2,150, 1%, prec. |
| 38 | 100 pot. |
| 41 | 3,900. |
| 45, 72 | 1,500. |
| 46 | 390. |
| 50 | 500K. |
| 51 | 68K. |
| 52, 60, 67 | 10K. |
| 55, 92 | 330K. |

| Component: | Resistance in ohms |
|---|---|
| 57, 81, 88 | 100K. |
| 61 | 5K pot. |
| 64, 65, 73 | 1,000. |
| 66 | 5,600. |
| 68 | 470K. |
| 77 | 100. |
| 82 | 47K. |
| 87 | 2,700K. |
| 89 | 270. |
| 101 | 270, 1 w. |

While only a particular embodiment of the invention has been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

What is claimed is:

1. A control system for regulating energy transfer to a cooling load and to a heating load as a function of the temperature measured by a temperature-sensitive component, including:
   an input circuit, comprising said temperature-sensitive component and an adjustable component, connected to provide a control signal which is a function both of the temperature sensed by said component and of the setting of said adjustable component;
   a first delay stage, coupled to said input circuit, for providing a trigger signal delayed in time relative to said control signal;
   a first switch, coupled between said first delay stage and said cooling load, for passing energy to said cooling load in accordance with said trigger signal received from said first delay stage;
   an inverter stage, coupled to said input circuit, for providing a control signal inverted relative to the control signal passed from said input circuit to said first delay stage;
   a second delay stage, coupled to said inverter stage, for providing a trigger signal delayed in time relative to the inverted control signal provided by said inverter stage;
   a second switch, coupled between said second delay stage and said heating load, for passing energy to the heating load in accordance with said trigger signal received from said second delay stage; and
   means for energizing said control system to effect the desired energization of the heating and cooling loads.

2. A control system as claimed in claim 1 in which each of said first and second delay stages comprises a Darlington-connected pair of transistors and associated circuit components, for providing the desired time delay between the trigger signal and the control signal.

3. A control system as claimed in claim 1 in which each of said first and second switches comprises an input potentiometer and a feedback-connected pair of transistors, connected in a switching circuit such that the setting of said input potentiometer determines the level at which said feedback pair of transistors are gated on as the amplitude of said trigger signal increases.

4. A control system as claimed in claim 3 in which each of said first and second switches further comprises a thyristor connected for operation to in turn energize its associated heating or cooling stage, and a Darlington-connected pair of transistors, coupled between said thyristor and said feedback-connected pair of transistors, for preventing spurious triggering of said feedback-connected pair of transistors as the thyristor is operated.

5. A control system for regulating selective energy transfer to one or more of a plurality of cooling stages and heating stages as a function both of the temperature measured by a temperature-sensitive component and of a reference value established by an adjustable component, comprising:
   a bridge circuit, including said temperature-sensitive component and said adjustable component, connected to provide a control signal related both to said temperature and to said reference value;
   a first delay stage, coupled to said bridge circuit, including a Darlington-connected transistor pair for providing a trigger signal delayed in time relative to said control signal;
   a first switch, coupled between said first delay stage and a first one of said cooling stages, for passing energy to said first cooling stage in accordance with said trigger signal received from said first delay stage;
   an inverter stage, coupled to said bridge circuit, for providing a control signal inverted, in a logic sense, relative to the control signal passed from said bridge circuit to said first delay stage;
   a second delay stage, coupled to said inverter stage, including a Darlington-connected transistor pair for providing a trigger signal delayed in time relative to the inverted control signal provided by said inverter stage;
   a second switch, coupled between said second delay stage and a first one of said heating stages, for passing energy to said first heating stage in accordance with said trigger signal received from said second delay stage; and
   means for energizing said control system to effect the desired energization of the heating and cooling stages.

6. A control system as claimed in claim 5 in which each of said first and second switches comprises an input potentiometer and a feedback-connected pair of transistors, connected in a switching circuit such that the setting of said input potentiometer determines the level at which said feedback pair of transistors are gated on as the amplitude of said trigger signal increases.

7. A control system as claimed in claim 6 in which each of said first and second switches further comprises a thyristor connected for operation to in turn energize its associated heating or cooling stage, and a Darlington-connected pair of transistors, coupled between said thyristor and said feedback-connected pair of transistors, for preventing spurious triggering of said feed-back-connected pair of transistors as the thyristor is operated.

References Cited

UNITED STATES PATENTS

| 3,096,937 | 7/1963 | Steiner | 236—78 |
| 3,215,348 | 11/1965 | Nelson et al. | 236—68 |

ROBERT A. O'LEARY, Primary Examiner

CHARLES SUKALO, Assistant Examiner

U.S. Cl. X.R.

236—78